United States Patent
Kim

(10) Patent No.: US 8,191,096 B2
(45) Date of Patent: May 29, 2012

(54) CONTROL DEVICE AND METHOD FOR CHANNEL SEARCHING IN IMAGE DISPLAY DEVICE

(75) Inventor: Jin-Young Kim, Gumi (KR)

(73) Assignee: LG Electronics Inc., Seoul (KR)

(*) Notice: Subject to any disclaimer, the term of this patent is extended or adjusted under 35 U.S.C. 154(b) by 295 days.

(21) Appl. No.: 12/447,099

(22) PCT Filed: Oct. 25, 2007

(86) PCT No.: PCT/KR2007/005287
§ 371 (c)(1),
(2), (4) Date: May 18, 2009

(87) PCT Pub. No.: WO2008/051035
PCT Pub. Date: May 2, 2008

(65) Prior Publication Data
US 2009/0300682 A1   Dec. 3, 2009

(30) Foreign Application Priority Data
Oct. 27, 2006  (KR) .................. 10-2006-0104963

(51) Int. Cl.
*G06F 3/00* (2006.01)
*H04N 7/173* (2006.01)

(52) U.S. Cl. ............ 725/86; 725/37; 725/53; 725/92; 725/93; 725/100

(58) Field of Classification Search .......... 725/38, 725/39, 44, 58, 61, 87, 100, 131, 151
See application file for complete search history.

(56) References Cited

U.S. PATENT DOCUMENTS

| 5,251,034 | A | 10/1993 | Na |
| 5,371,550 | A | 12/1994 | Shibutani et al. |
| 2003/0122963 | A1* | 7/2003 | Kim et al. ............. 348/468 |
| 2004/0060063 | A1* | 3/2004 | Russ et al. ............. 725/46 |
| 2007/0033624 | A1* | 2/2007 | Oh ............. 725/100 |
| 2008/0092168 | A1* | 4/2008 | Logan et al. ............. 725/44 |

FOREIGN PATENT DOCUMENTS

| CN | 1455586 A | 11/2003 |
| EP | 0 955 771 A | 11/1999 |
| EP | 01361752 A2 | 11/2003 |
| EP | 1 628 483 A1 | 2/2006 |
| GB | 2 348 330 A | 9/2000 |
| JP | 2001-36835 A | 2/2001 |
| KR | 2000-0012880 A | 3/2000 |
| KR | 10-2005-0080324 A | 8/2005 |

* cited by examiner

*Primary Examiner* — Kieu Oanh T Bui
(74) *Attorney, Agent, or Firm* — Birch, Stewart, Kolasch & Birch, LLP

(57) ABSTRACT

Provided are a system and a method for channel searching in an image display device. When there are requests for channel searching and setting with respect to a broadcasting signal received through a signal receiving unit, image or audio data set by a user are outputted to a standby screen or while the channel searching. Or, after calculating a required time for the channel searching, image or audio data having a playing time close to the calculated required time are extracted for output while channel searching.

11 Claims, 3 Drawing Sheets

[Fig. 1]
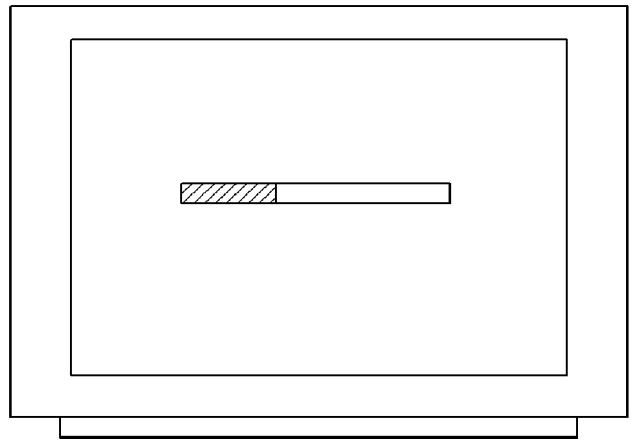
[Fig. 2]
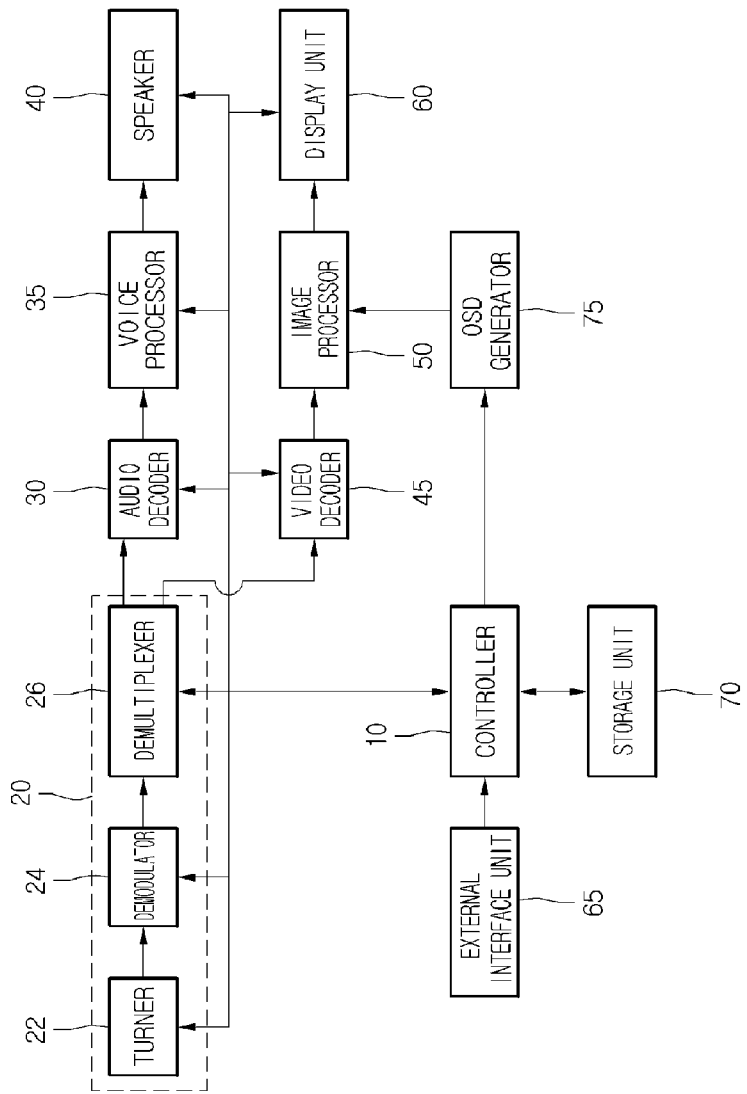

[Fig. 3]
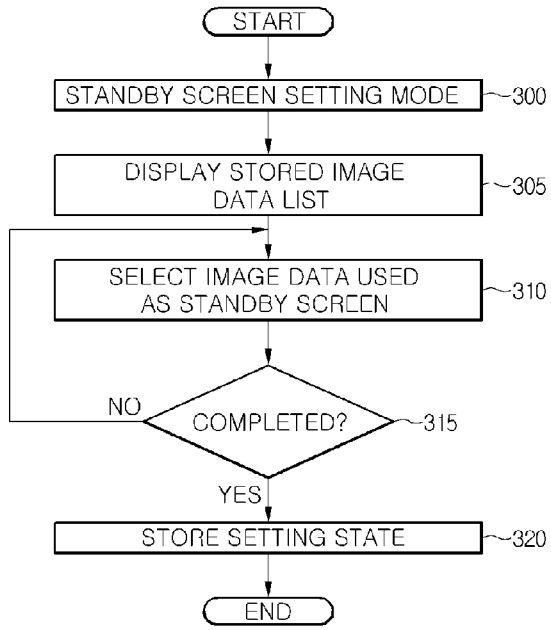
[Fig. 4]
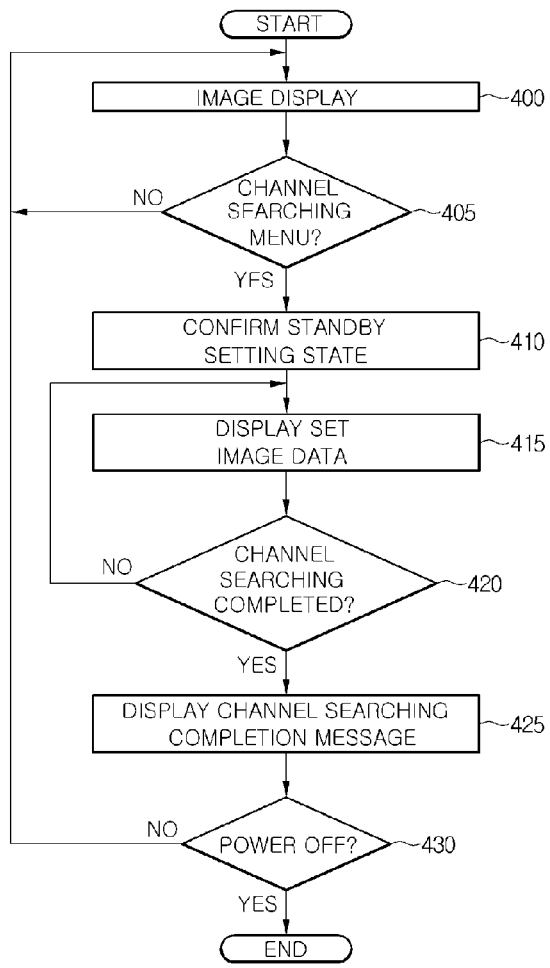

[Fig. 5]
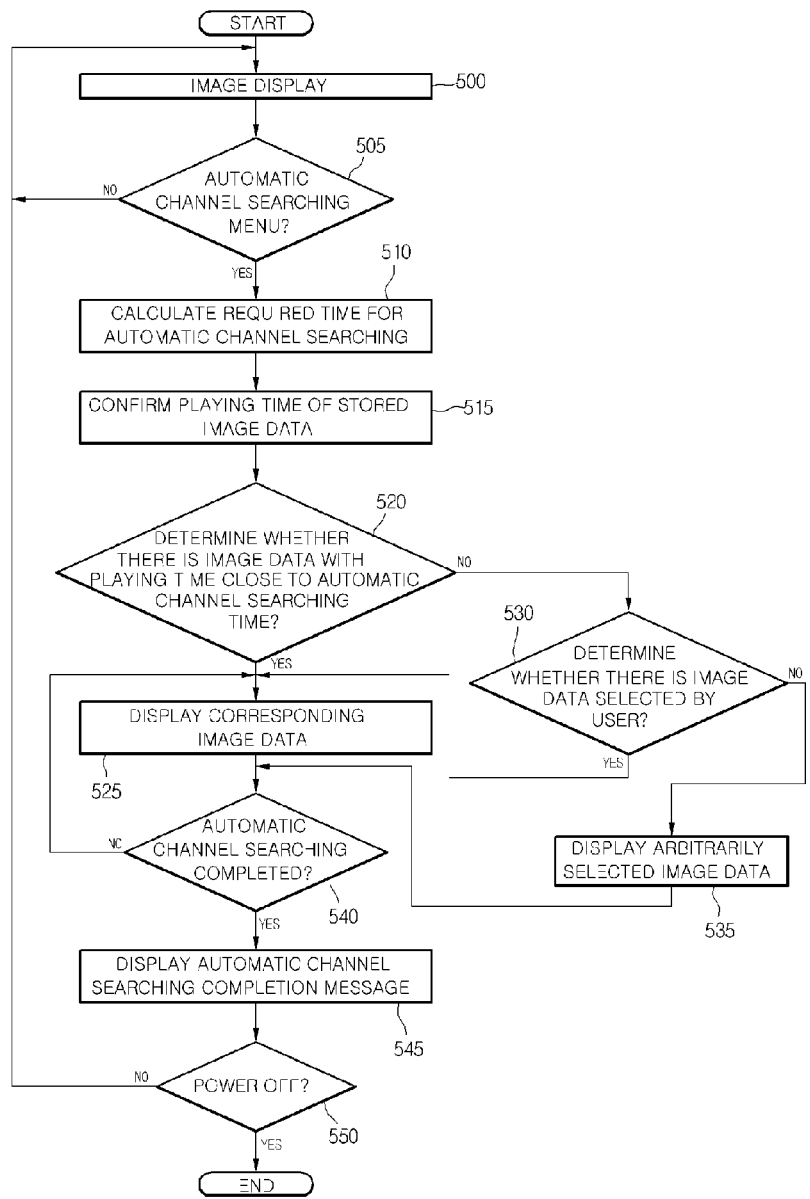
[Fig. 6]
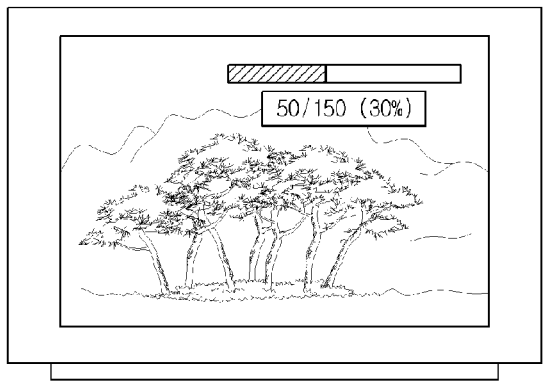

CONTROL DEVICE AND METHOD FOR CHANNEL SEARCHING IN IMAGE DISPLAY DEVICE

TECHNICAL FIELD

The present disclosure relates to an image display device, and more particularly, to a control device and a method for channel searching in an image display device to display a standby image set by a user while the channel searching.

BACKGROUND ART

The representative example of an image display device includes a television. Recently, interest in a digital television that employs a broadcasting signal transmitting method and a digital broadcasting method increases according to development of broadcasting technology.

The digital television can minimize noise influence because an analog broadcasting signal is transmitted in a digital form, and also can easily reproduce an image that is almost identical to an original image.

Although only sky wave channels could be received in the past, the image display device can currently receive various broadcasting channels through cables and satellite broadcastings. As a result, the image display device provides at least 50 and at most 100 channels to a user. Accordingly, a user may have a difficult time to effectively manage these channels.

Because a plurality of channels are provided, a user searches channels periodically or non-periodically to automatically or manually reset the channels with respect to a broadcasting signal received from the outside.

However, due to the diversified channels, it requires a long time, e.g., several minutes, for channel searching. Accordingly, while the channel searching, television sound is muted and a television screen becomes black as illustrated in FIG. 1.

Accordingly, a user can roughly confirm a percentage of completion about the channel searching by using a simple progress bar in the blackened screen, and also may feel dull during a waiting time for the channel searching because only the progress bar without sound is provided.

DISCLOSURE OF INVENTION

Technical Problem

Accordingly, a user can roughly confirm a percentage of completion about the channel searching by using a simple progress bar in the blackened screen, and also may feel dull during a waiting time for the channel searching because only the progress bar without sound is provided.

Technical Solution

Embodiments provide a device and a method for displaying a standby screen image to a user while channel searching.

Embodiments also provide a device and a method for easily confirming a processing state while channel searching.

In one embodiment, a control de for channel searching in an image display device includes: a signal receiving unit receiving broadcasting signals from the outside; a storage unit storing one of an image and an audio among the received broadcasting signals according to a user s request and storing a corresponding channel according to channel searching; a key input unit receiving a request command of a user; a controller performing the channel searching through the signal receiving unit and outputting one of the image and the audio stored in the storage unit when receiving a channel searching command from the key input unit; a display unit outputting the image stored in the storage unit according to control of the controller while the channel searching; and an audio output unit outputting the audio.

In another embodiment, a method for controlling channel searching in an image display device includes: receiving a channel searching command from a user; performing the channel searching with respect to a broadcasting signal inputted through a signal receiver; and outputting one of a pre-stored image and audio while the channel searching.

The details of one or more embodiments are set forth in the accompanying drawings and the description below. Other features will be apparent from the description and drawings, and from the claims.

Advantageous Effects

When there are requests for channel searching and setting with respect to a broadcasting signal received through a signal receiving unit, image or audio data set by a user are outputted to a standby screen or while the channel searching. Or, after calculating a required time for the channel searching, image or audio data having a playing time close to the calculated required time are extracted for output while channel searching.

BRIEF DESCRIPTION OF THE DRAWINGS

FIG. 1 is a view of a screen displayed when a related art image display device controls channel searching.

FIG. 2 is a block diagram of an image display device according to an embodiment.

FIG. 3 is a flowchart of a standby screen setting while channel searching according to one embodiment.

FIG. 4 is a flowchart of a standby screen display operation while channel searching according to one embodiment.

FIG. 5 is a flowchart of a standby screen display operation while channel searching according to another embodiment.

FIG. 6 is a view of a standby screen displayed while channel searching according to an embodiment.

MODE FOR THE INVENTION

Reference will now be made in detail to the embodiments of the present disclosure, examples of which are illustrated in the accompanying drawings.

FIG. 2 is a block diagram of an image display device according to an embodiment. FIG. 3 is a flowchart of a standby screen setting while channel searching according to one embodiment. FIG. 4 is a flowchart of a standby screen display operation while channel searching according to one embodiment. FIG. 5 is a flowchart of a standby screen display operation while channel searching according to another embodiment. FIG. 6 is a view of a standby screen displayed while channel searching according to an embodiment.

As illustrated in FIG. 2, a structure of an image display device for channel searching includes a turner 22 selecting a broadcasting signal of a channel by a user among broadcasting signals inputted from the outside, a demodulator 24 demodulating the broadcasting signal selected through turner 22, a receiver 20 demultiplexing the signal, i.e., a multiplexed transport stream by time, inputted through the demodulator 24 in order to divide it into sound, image, and additional information stream, an audio decoder 30 decoding a sound signal processed through the receiver 20, a sound processor 35 processing the sound signal decoded through the audio decoder 30 for output, and a speaker 40 outputting the sound signal processed through the sound processor 35.

Additionally, the image display device includes a video decoder 45 decoding the image signal processed through the receiver 20, an image processor 50 making the image signal decoded through the video decoder 45 be displayable, and a display unit 55 displaying the image signal processed through the image processor 50.

The image display device includes a key input unit 75, a storage unit 65, a controller 10, and an on-screen-display (OSD) generator. The key input unit receives a command from a user. The storage unit 65 stores a stream and channel map inputted through the demultiplexor 26 of the receiver 20. The controller 10 controls a standby image to be displayable through the display unit 55 while channel searching once a channel searching command is inputted through the key input unit 56. The OSD generator 75 generates a percentage of completion about the channel searching progressed by the turner in an OSD while the standby image is displayed through the display unit 55 according to a control signal of the controller 10.

An external interface unit 60 is a connection means that can be connected to an external device. In the embodiment, image or audio data stored in an external device is displayed in a standby screen when the image display device searches channels according to whether or not to be connected to the external device through the external interface unit 60.

FIG. 3 is a flowchart of a standby screen setting while channel searching according to one embodiment.

In operation 300, a controller 10 executes a standby screen setting mode to set a standby image screen for displaying a standby image when a user requests channel searching. The standby screen setting mode can be set thrash a menu or a key input.

In operation 305, the controller 10 displays a pre-stored image data list in the display unit 55, which is in the storage unit 65 that stores the images received from the outside, according to selection of the user once the standby screen setting mode is executed.

In operation 310, the controller 10 selects image data that will be used in a standby screen while channel searching, which is selected from the image data list displayed in the display unit 55. When the controller 10 detects the signal input notifying that the setting of the standby image is completed in operation 315, it stores the setting state of the standby screen in operation 320, and then terminates the standby screen setting mode.

FIG. 4 is a flowchart of a standby screen display operation while channel searching according to one embodiment.

In operation 400, the controller 10 controls an image and an audio to be outputted through the display unit 55 and the speaker 40, which are related to a channel requested from a user or a channel that a user is watching when the image display device is turned on.

In operation 405, the controller 10 determines whether a menu key input signal for setting a broadcasting channel is inputted or not when detecting occurrence of a key input signal through the key input unit 75 or a remote controller while displaying an image. In operation 410, the controller 10 confirms a standby screen setting state preset by a user when the input signal is inputted through a broadcasting channel setting menu key.

In operation 415, the controller 10 outputs image data, which is preselected by a user, through the display unit 55 or the speaker 40 according to a standby screen setting state while executing the channel searching menu. When outputting an image or an audio according to the channel searching menu a state and a percentage of completion or a required time and a remaining time for the channel searching are additionally displayed through an OSD screen.

The controller 10 periodically or occasionally confirms whether the channel searching is completed or not. Accordingly, it is determined whether the channel searching is completed or not in operation 420. In operation 430, when the channel searching is completed, a channel searching completion message is outputted to the display unit.

Then, the controller 10 stores a broadcasting channel selected according to the channel searching and information corresponding to the broadcasting channel in the storage unit 65, and also determines whether or not a power-off signal is outputted to terminate an image display or display again the previously-displayed image in operation 430.

According to the embodiment, a previously-selected image is displayed during channel searching when a user requests the channel searching.

FIG. 5 is a flowchart of a standby screen display operation while channel searching according to another embodiment.

When the image display device is turned on, the controller 10 controls an image and an audio to be outputted through the display unit 55 and the speaker 40, which are related to a channel that a user requests or a channel that a user previously watched in operation 500.

In operation 505, the controller 10 detects whether an automatic channel search menu is selected through the key input unit 75 or the remote controller. The controller 10 calculates the required time for channel searching with respect to a broadcasting signal received through a signal receiver 20 according to the input of an automatic channel search menu in operation 510.

Then, the controller 10 confirms the calculated required time for channel searching and determines whether there is data having a playing time close to the required time among image or audio data that are previously-stored in the storage unit 65 in operation 520. The controller 10 outputs the image or audio data having the playing time close to the required time through the display unit 55 and the speaker 40 according to the confirmed result in operation 525.

On the other hand, the controller 10 determines whether there is image data that are preselected by a user if there is no image or audio data having a playing time close to the required time in operation 530. The controller 10 temporarily or repeatedly outputs image data or audio data preselected by a user in operation 525, or selects and outputs arbitrary data while channel searching according to the determination result in operation 535.

The controller 10 determines whether the automatic channel searching is completed or not in operation 540, and displays the automatic channel searching complete message when the channel searching is completed in operation 545. Then, the controller 10 determines whether the image display device is turned off or not in operation 550, and turns off the power or displays an image that is outputted before inputting a channel searching signal in operation 500.

According to another embodiment, when a user requests channel searching, the required time for channel searching is calculated to extract image or audio data having a playing time close to the calculated time and output it through the display unit 55 or the speaker 40.

FIG. 6 is a view of a screen displaying an image and a percentage of completion according to the channel searching in the image display device during the channel searching. While channel searching according to an embodiment, the required time for channel searching is calculated or set by a user to output data having a playing time close to the calculated time.

Although the embodiment is described herein limited to the image or audio data in the storage unit 65 inside the image display device in order to output it into a standby screen while the channel searching. However, in a case of equipping with an external interface unit as illustrated in FIG. 2, image or audio data stored in the external device connected to the external interface unit are read to output them while channel searching.

Additionally, the embodiment is described herein limited to simultaneously outputting of image or audio data while the channel searching. However, a user can set up an on/off state for a standby output. Such that image or audio data can be outputted according to the setting state.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A control device for channel searching in an image display device, the control device comprising:
    a signal receiving unit configured to receive broadcasting signals from the outside;
    a storage unit configured to store one of an image and an audio among the received broadcasting signals according to a user's request and to store a corresponding channel according to channel searching;
    a key input unit configured to receive a request command of a user;
    a controller configured to calculate a required time for the channel searching when a channel searching command is received from the key input unit, to compare the required time for the channel searching with a playing time for one of image and audio data stored in the storage unit, and to display an image and audio data having the playing time close to the required time during the channel searching;
    a display unit configured to output the image data stored in the storage unit according to control of the controller during the channel searching; and
    an audio output unit configured to output the audio data.

2. The control device according to claim 1, further comprising:
    an interface unit connected to an external storage medium to display one of an image and an audio stored in the external storage medium through the display unit while the channel searching.

3. The control device according to claim 1, wherein controller extracts and outputs arbitrary data stored in the storage unit when there is no data having a playing time close to the required time.

4. The control device according to claim 1, wherein the controller calculates a percentage of completion according to the channel searching to display the percentage of completion through the display unit.

5. The control device according to claim 1, wherein the controller terminates an output of one of the image and audio data when the channel searching is completed.

6. A method for controlling channel searching in an image display device, the method comprising:
    receiving, through an input unit of the image display device, a channel searching command from a user;
    calculating a required time for the channel searching when the channel searching command is received;
    comparing the required time for the channel searching with a playing time for one of image and audio data stored in a storage unit;
    performing the channel searching with respect to a broadcasting signal inputted through a signal receiver; and
    outputting an image and audio data having the playing time close to the required time during the channel searching.

7. The method according to claim 6, further comprising:
    displaying information corresponding to the channel searching in one of an on-screen-display screen and a picture-in-picture screen during the channel searching.

8. The method according to claim 6, further comprising:
    determining whether or not there is one of pre-selected image and audio data to output during the channel searching when the channel searching command is received; and
    outputting data corresponding to the one of pre-selected image and audio data when there is one of the pre-selected image and audio data.

9. The method according to claim 8, wherein selecting of one of the image and audio data to be outputted in a standby screen during the channel searching comprises:
    executing a standby screen setting mode;
    displaying one of an image and audio data lists pre-stored in a storage unit; and
    selecting at least one data from one of the displayed data list.

10. The method according to claim 8, wherein when an output of one of the image and audio data selected by the user is terminated during the channel searching, the corresponding data is repeatedly output until the channel searching is completed.

11. The method according to claim 6, further comprising:
    outputting of one of a pre-stored image and audio during the channel searching according to whether a standby image mode is turned on or off.

* * * * *